INVENTORS
ROBERT SERRELL &
EDWIN A. GOLDBERG
BY Morris Hahn
ATTORNEY

INVENTORS
ROBERT SERRELL &
EDWIN A. GOLDBERG
BY Morris Liebmann
ATTORNEY

Patented Oct. 7, 1952

2,613,032

UNITED STATES PATENT OFFICE 2,613,032

COMPUTING DEVICE

Robert Serrell, Princeton, and Edwin A. Goldberg, Princeton Junction, N. J., assignors to Radio Corporation of America, a corporation of Delaware Application May 7, 1949, Serial No. 92,032

6 Claims. (Cl. 235—61)

This invention relates to computing devices and more particularly to the provision of an improved device and method of operation whereby the unknown quantities of linear simultaneous equations, secular equations or polynomials may be determined.

The device of the present invention is similar in many respects to the linear simultaneous equation solvers disclosed by Brown and Goldberg Patent No. 2,454,549 and Brown Patent No. 2,455,974.

The present device, like those of the aforesaid patents, utilizes the amplitudes and relative polarities of a plurality of voltages to represent the values and signs of the known quantities of the equations, and includes a plurality of amplifiers interconnected by mutual feedback circuits in such a manner that the amplitude and relative polarity of the output voltage of each amplifier represents the value and sign of a different unknown when there is applied, (1) to the input of each amplifier a voltage representative of the constant quantity of a different equation and (2) to the feedback circuits of each amplifier voltages respresentative of the coefficients of the corresponding unknowns.

The present device is also like those of the patents in that the adjustment required to establish the voltages representative of the known terms is effected by means of voltage dividers of the potentiometer type, each having an accurately calibrated dial scale adjustable to three significant places for determining the amplifier input voltages in terms of a selectable percent of the reference voltage and for deriving from each amplifier output the desired fractional feedback voltages which represent the coefficients of the unknowns.

The present device is distinguished from those of the aforesaid patents in that it involves new structural features and makes possible new methods of computation. The principal physical modifications are (1) the use of plural potentiometers for the matrix instead of single ones, (2) the addition of a number of amplifiers, and (3) the addition of two or more groups of ganged potentiometers. The new methods of computation involve the provision of means necessary for obtaining absolutely stable operation in all cases and for adjusting the value of a complex determinant until it vanishes.

Assuming the present device to have a 12×12 matrix, it is operable to solve (1) systems of linear simultaneous equations of all orders up to and including 12, (2) secular equations of all orders up to and including 6 for real and complex roots (characteristic roots of matrices or eigen values), and (3) polynomials of all degrees up to and including 6 for real and complex roots. Obviously the operating range of the device may be increased by increasing the size of the matrix and the number of its associated components.

None of the computing devices heretofore available appear to be capable of solving all these different types of equations with such simple equipment as that herein disclosed. As hereinafter shown, it includes 12 dials for setting up the values of the known quantities and 144 dials for setting up the values of the coefficients of the unknown quantities. In addition, two dials each controlling a different group of ganged potentiometers are provided for the real and imaginary parts of the roots of secular equations and of polynomials. A switch and a dial for the determination of the unknowns (in a system of linear simultaneous equations) and a cathode ray tube type of null indicator are arranged in a manner similar to that disclosed by the aforesaid patents. There is also provided a switch for selecting the mode of operation of the device so that it will function to solve the different types of equations. Meters may be provided for simultaneously giving a continuous indication of the values of the unknowns in a system of linear equations.

The principal object of the invention is the provision of an improved computing device which is readily operated to solve different types of equations. A further object is the provision of a computing device having such control elements that it may be readily adapted to determine the unknown quantities of linear simultaneous equations, secular equations or polynomials.

The invention will be better understood from the following description when considered in connection with the accompanying drawings.

Referring to the drawings.

The connections of the amplifiers, the generator and the bridge circuit indicator are not shown in detail for the reason that they are fully disclosed in the aforesaid patents and in an article by E. A. Goldberg entitled "Details of the simultaneous equation solver," RCA Review, vol. 9, No. 3, September 1948, pp. 394–405.

Figure 1:
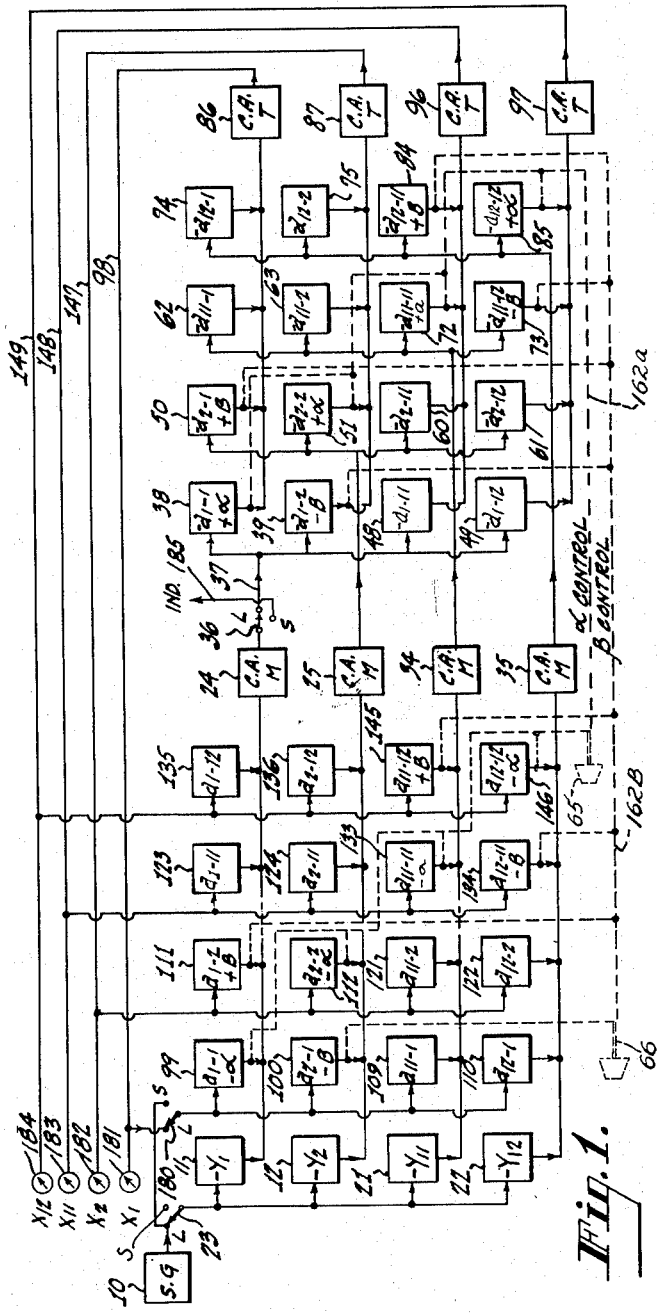
Fig. 1 is a block diagram indicating the relation between the various parts of the improved computing device.

Fig. 1 illustrates the improved device as including a signal generator 10 and a plurality of networks 11, 12, ... 21 and 22 which are (1) arranged to be connected to the output of the generator 10 through a switch 23 and (2) are adjusted, as hereinafter explained, to provide voltages which are representative of the constant quantities $Y_1, Y_2 ... Y_{11}$ and $Y_{12}$ of the equations to be solved. The signal generator 10 produces an alternating reference voltage which may have a frequency of the order of 1000 cycles per second. The networks 11, 12, ... 21 and 22 are like the corresponding networks shown in Fig. 2 of Patent No. 2,454,549 within the dotted rectangles $Y_1, Y_2 ... Y_n$ and identified by the reference numeral 117.

The output voltage of each network 11, 12, ... 21 or 22 is applied to the input of a different amplifier 24, 25, ... 34 or 35. The output voltage of the amplifier 24 is applied through a switch 36 and a lead 37 to the input of the networks 38, 39, ... 48 and 49 of the transposed matrix of the device. Similarly the output voltages of the amplifiers 25, 34 and 35 are applied respectively (1) to the networks 50, 51, ... 60 and 61, (2) to the networks 62, 63, ... 72 and 73, and (3) to the networks 74, 75, ... 84 and 85 of the transposed matrix.

Output voltage is applied (1) from the networks 38, 50, 62 and 74 to the input of an amplifier 86, (2) from the networks 39, 51, 63, and 75 to the input of an amplifier 87, (3) from the networks 48, 60, 72 and 84 to the input of an amplifier 96, and (4) from the networks 49, 61, 73 and 85 to the input of an amplifier 97.

The output voltages of the amplifiers 86, 87, ... 96 and 97 are fed back to the networks of the main matrix of the device. Thus feedback voltage is applied (1) from the amplifier 86 through a lead 98 to the networks 99, 100, ... 109 and 110, (2) from the amplifier 87 through a lead 147 to the networks 111, 112, ... 121 and 122, (3) from the amplifier 96 through a lead 148 to the networks 123, 124, ... 133 and 134, and (4) from the amplifier 97 through a lead 149 to the networks 135, 136, ... 145 and 146.

Output voltages are applied (1) from the networks 99, 111, 123 and 135 to the input of the amplifier 24, (2) from the networks 100, 112, 124 and 136 to the input of the amplifier 25, (3) from the networks 109, 121, 133 and 145 to the input of the amplifier 34, and (4) from the networks 110, 122, 134 and 146 to the input of the amplifier 35.

The various networks of the main and transposed matrices of the device are similar. A detailed description of the network 99 of the main matrix therefore is sufficient for a complete understanding of all the connections involved in the two matrices.

Figure 2:
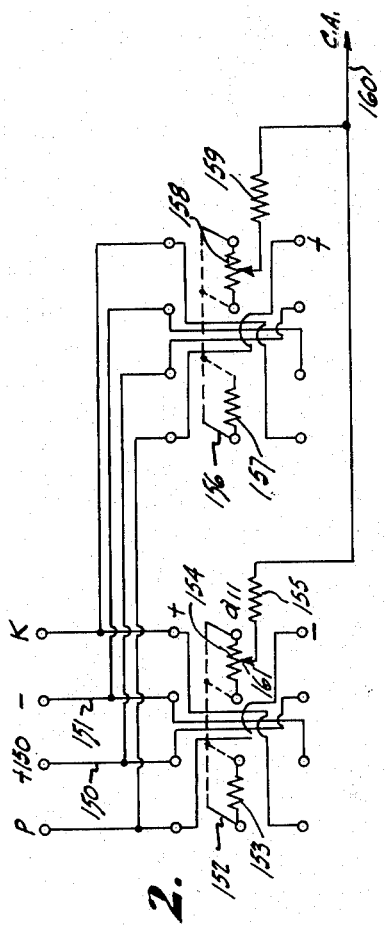
Fig. 2 is a wiring diagram of the connections within one of the boxes of Fig. 1.

Fig. 2 shows the network 99 as including input terminals P and K which are connected respectively to the anode and cathode of the amplifier 86 from which this network is energized. Operating voltage is applied to the amplifier 86 from leads 150 and 151 through a double-throw switch 152. In its upper closed position, the switch 152 connects (1) a fixed resistor 153 in the anode lead of the amplifier 86 and (2) a potentiometer 154 in the cathode lead of the amplifier 86. When the switch 152 is in its lower closed position, the potentiometer 154 is in the anode lead and the resistor 153 is in the cathode lead. As explained in the aforesaid patents, this arrangement provides for positive or negative values of the coefficients of the unknown quantities of the equations and insures that the push-pull output of the amplifier is balanced at all times. Output voltage from the potentiometer 154 is applied through a summing resistor 155 to the input of the amplifier 24.

All the networks of both the main and transpose matrices contain a potentiometer, resistor and switch interconnected as described above. As so far described, however, the system is substantially similar to the "simultaneous equation solver" previously referred to. One of the distinctions between the embodiment of the invention being described herein and the above indicated "simultaneous equation solver" is in the provision of an extra potentiometer, resistor and switch network similar to the one just described which is connected in parallel with the network just described. This is illustrated in Figure 2, wherein the network 99 also includes a double-throw switch 156 which is connected to the output of the amplifier 86 in parallel with the switch 152. When the switch 156 is in its upper closed position, a fixed resistor 157 is connected in the anode lead and a potentiometer 158 is connected in the cathode lead. The connections of the resistor 157 and potentiometer 158 are reversed when the switch 156 is in its lower closed position. Output voltage from the potentiometer 158 is applied through a summing resistor 159 and a lead 160 to the input of the amplifier 24.

The parallel potentiometer network shown in Figure 2 is representative of the rectangles shown in Figure 1 which have two letters inscribed therein. In Figure 1 these are the networks along a principal diagonal of the main matrix 99, 112, 133, 146 and the networks one row and one column adjacent both ends of the diagonal which include networks 100, 111 at one end the networks 134 and 145 at the other end. In the transpose matrix the network along the principal diagonal having parallel potentiometer networks are networks 38, 51, 72 and 85, networks 39 and 50 at one end of the diagonal and networks 73 and 84 at the other end of the diagonal. As indicated above the identified rectangles have two letters inscribed therein;

$$\pm a_{nn} \pm \alpha \text{ or } \pm a_{nn} \pm \beta$$

The letter $a_{nn}$ represents a coefficient and the letters $\alpha$ and $\beta$ respectively represent the real and imaginary roots of a secular equation. One of the parallel potentiometers in each network is used to establish a voltage proportional to the known "$a_{nn}$" coefficient. The other potentiometer is used to determine the value of $\alpha$ or $\beta$ depending on which of the two functions it is assigned to represent. The proper polarity is determined by the switches. The algebraic addition indicated is provided by combining the outputs of the parallel potentiometers in the manner illustrated for the outputs of potentiometers 154 and 158 in Figure 2.

The fact that in Figure 1 double potentiometers are indicated as being only along a principal diagonal and at both ends of the diagonal is not to be taken as a limitation. The precise number of double potentiometer networks required for the solution of secular equations or complex roots of polynomial equations is derived subsequently herein. All the networks of the matrices may be of the double potentiometer type or only certain ones. Figure 1 is shown herein by way of illustration and to aid in the explanation of the principles involved.

It should be understood (1) that all the networks of the main and transposed matrices are similar, (2) that calibrated knobs similar to those described in the aforesaid patents may be provided for setting the contact members 161 etc. to select voltages proportional to the values of the various coefficients of the unknown quantities of the equations, (3) that the polarity of the selected voltage is determined in each case by the closed position of the corresponding switch, and (4) that when the value of the coefficient or root is zero the corresponding potentiometer is set at zero.

As indicated by the broken lines 162α of Fig. 1, the movable members of each one of the parallel potentiometers assigned to represent the function $a$, by which the real value of a root, $a$, is determined in a manner subsequently described herein, may be all ganged together and operated from a single calibrated knob 65. Similarly the movable contact members of each one of the parallel potentiometers assigned to represent the function $\beta$ by which the imaginary value of a root, $\beta$, is determined in a manner subsequently described herein may be all ganged together as indicated by the dash-dot line 162β and operated from a single calibrated knob 66. As indicated by the aforesaid patents, the same is true of the movable contact members which are operated to set corresponding coefficients into the two matrices.

Figure 3:
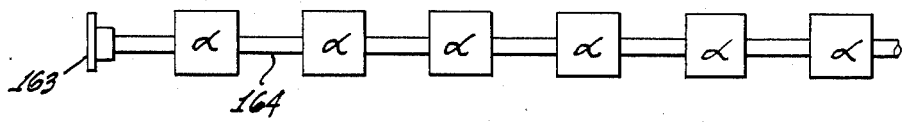
Fig. 3 illustrates how certain of the potentiometers may be ganged together for simultaneous adjustment.

The movable contact members of the α potentiometers intercoupled as indicated by the broken line 162α of Fig. 1 may have their positions adjusted by a single calibrated knob 163 such as that shown by Fig. 3. In this figure, each of the squares is intended to represent a potentiometer having its movable contact fixed to a shaft 164 which is rotated by the knob 163. Similar means may be provided for controlling the β potentiometers which are ganged as indicated by the dash-dot line 162β of Fig. 1.

Figure 4:
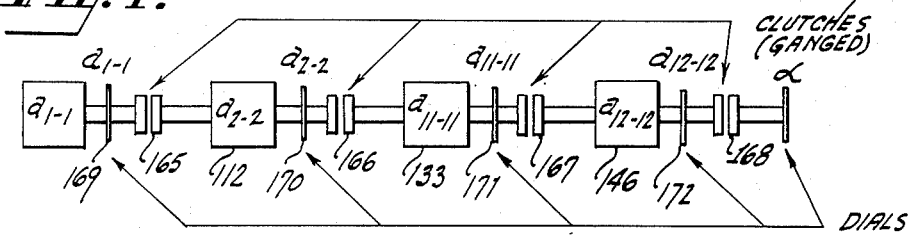
Fig. 4 illustrates a modified system of ganging such potentiometer which reduces the required number of potentiometers.
Figure 5:
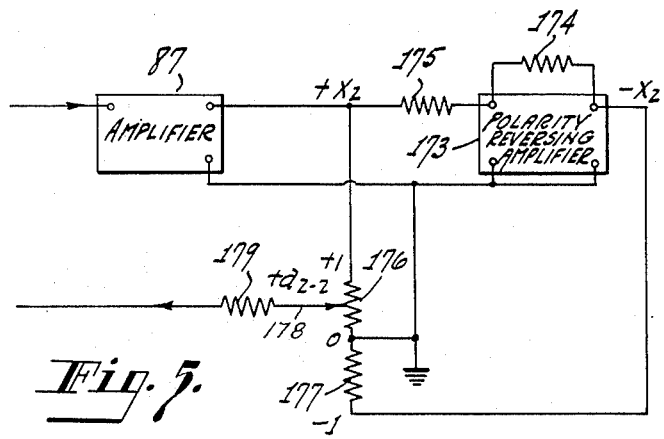
Fig. 5 illustrates a method of providing for both the positive and negative values of a coefficient of the unknown quantity.

Fig. 4 shows a modified control means by which a voltage representative of the algebraic sum of the coefficient $a_{nn}$ and root $a$ or $\beta$ may be derived from a single potentiometer such as the potentiometer 154 with its movable contact member 161 of Fig. 2. As indicated by Fig. 4, a clutch 165, 166, 167 or 168 is interposed between the shafts to which the respective movable contact members are fixed. These clutches (1) may be of any suitable type which is electrically or mechanically operated and (2) are disengaged while the values of the coefficients $a_{11}$ etc. are set into the potentiometers by means of the calibrated knobs or dials 169, 170, 171, 172, etc. Thereafter, the clutches are engaged and one of the knobs may be adjusted in the same manner as knob 163 in Figure 3 is adjusted to determine the value of the root $a$ in the manner subsequently described herein. This same type of control, of course, is applicable to obviate the requirement for extra β potentiometers and in other cases where the output voltage of a network is required to represent the algebraic sum of more than one quantity of the equation.

Where control means such as that of Fig. 4 is used, no reversing switches, such as the switches 152 and 156 of Fig. 2 are required. Instead there may be provided a potentiometer control system such as that shown in Fig. 5. In this case, there is provided an additional amplifier 173 which is stabilized for gain as indicated by the feedback resistor 174 and is of the polarity reversing type. The output voltage of the amplifier 87, for example, is applied through a resistor 175 to the input of the amplifier 173. The output voltages of the amplifiers 87 and 173 are applied to opposite sections 176 and 177 of the potentiometer in such a way that the contact member 178 may be operated to set into the device any desired plus or minus value of the coefficient $a_{2-2}$. The voltage so selected is applied through a summing resistor 179 to the input of the amplifier 25 of Fig. 1 as previously indicated.

When the device is utilized to solve linear simultaneous equations, the switches 23, 36 and 180 are in their illustrated closed positions and the values of the unknown quantities $X_1$, $X_2$, etc. are indicated by the meters 181, 182, etc. Alternatively these values may be measured more accurately by means of the bridge circuit described by the aforesaid patents. When the device is to be used for the solution of secular equations, the switches 23, 36 and 180 are closed at their S terminals and the value of the unknown quantities is indicated by the reading shown by the calibrations placed on the knobs which are used to adjust the ganged α potentiometers and the ganged β potentiometers. These α and β values are obtained after adjustment in a manner to be subsequently shown herein when an indicator (not shown) connected to the lead 185 indicates a zero voltage.

*Method of solving linear simultaneous equations*

For stable operation, this method is like that described by Goldberg and Brown in an article entitled "An electrical simultaneous equation solver," Journal of Applied Physics, vol. 19, No. 4, April 1948, pp. 339–345. Also see Patent No. 2,455,974 to George W. Brown, issued December 14, 1948.

In considering the mathematical expressions which follow, it will be noted that the various subscripts of the coefficients are not separated by a hyphen as they are in Fig. 1. For example, the coefficient $a_{1-1}$ applied to the network 99 of Fig. 1 appears in the mathematical expressions as $a_{11}$. It is to be understood, however, that the first digit or letter of the subscript always indicates the number of the equation and the following part of the subscript indicates its position in the equation.

In accordance with the method set forth in the Journal of Applied Physics, as well as Patent No. 2,455,974, the given system of equations of order $n$:

$$Y_1 = a_{11}x_1 + a_{12}x_2 + \ldots + a_{1n}x_n$$
$$Y_2 = a_{21}x_1 + a_{22}x_2 + \ldots + a_{2n}x_n$$
$$\vdots$$
$$Y_n = a_{n1}x_1 + a_{n2}x_2 + \ldots + a_{nn}x_n$$

with matrix A, is replaced by an equivalent system with a matrix derived from A whose order is twice that of A, or $2n$, and which may be written:

$$B = \begin{Vmatrix} 1 & 0 & \ldots & 0 & -a_{11} & \ldots & -a_{n1} \\ 0 & 1 & \ldots & 0 & -a_{12} & \ldots & -a_{n2} \\ \vdots & & & & & & \\ 0 & 0 & \ldots & 1 & -a_{1n} & \ldots & -a_{nn} \\ a_{11} & \ldots & a_{1n} & 0 & \ldots & & 0 \\ a_{21} & \ldots & a_{2n} & 0 & \ldots & & 0 \\ \hline a_{n1} & \ldots & a_{nn} & 0 & \ldots & & 0 \end{Vmatrix}$$

The Y vector of the original system is replaced by one which contains the $n$ original Y's and $n$ zero. As stated in the Journal of Applied Physics article and as shown in Patent No. 2,455,974, this $$[a_{11}-(\alpha+j\beta)](w_1+jz_1)+a_{12}(w_2+jz_2)+\ldots+a_{1n}(w_n+jz_n)=0$$
$$a_{21}(w_1+jz_1)+[a_{22}-(\alpha+j\beta)](w_2+jz_2)+\ldots+a_{2n}(w_n+jz_n)=0 \quad (1a)$$
$$\ldots\ldots\ldots\ldots\ldots\ldots\ldots\ldots\ldots\ldots\ldots\ldots\ldots\ldots\ldots\ldots\ldots\ldots\ldots$$
$$a_{n1}(w_1+jz_1)+a_{n2}(w_2+jz_2)+\ldots+[a_{nn}-(\alpha+j\beta)](w_n+jz_n)=0$$

substitution results in stable operation in every case. It is easily seen that by using $n^2$ double potentiometers for the $a$'s of matrix B, instead of $2n^2$ single ones, matrix B can be put into the machine by operating only $n^2$ controls—exactly as if only the original matrix A were used. The Y vector is also put into the machine by operating the same $n$ controls as would be necessary for the original system with matrix A.

For the solution of systems of linear simultaneous equations, this arrangement thus provides absolutely stable operation with a machine whose outward appearance and means of control are identical to those of the equations solver described in the aforesaid Patent 2,454,549. It is evident, however, that the number of amplifiers is equal to twice that which would otherwise be required. In order to solve systems of linear simultaneous equations of order 12, the present device requires 24 matrix amplifiers.

*Method of solving secular equations*

The purpose of this method is to obtain the real and complex roots of secular equations (sometimes called characteristic roots of matrices). It involves the use of the network of linear potentiometers and linear feedback amplifiers illustrated by Fig. 1 (with the switches 23, 36 and 180 in their "S" positions) to obtain continuously the values of $(2n-1)$ auxiliary unknowns where $n$ is the order of the secular equation. As will appear, the consistency of a set of $2n$ equations derived from the secular equation, established by means of a summing amplifier and a null indicator, provides an indication of the complex values of $\lambda$ at which the secular equation is satisfied, $\lambda$ being equal to $(\alpha+j\beta)$. This method is intended to deal with secular equations of degree $n$ of the type:

$$\begin{vmatrix} (a_{11}-\lambda) & a_{12} & \ldots & a_{1n} \\ a_{21} & (a_{22}-\lambda) & \ldots & a_{2n} \\ \ldots & \ldots & \ldots & \ldots \\ a_{n1} & a_{n2} & \ldots & (a_{nn}-\lambda) \end{vmatrix} = 0$$

with real coefficients and complex roots.

We shall write: $\lambda=(\alpha+j\beta)$. Pairs of values of $\alpha$ and $\beta$ are required such as to give:

$$\begin{vmatrix} [a_{11}-(\alpha+j\beta)] & a_{12} & \ldots & a_{1n} \\ a_{21} & [a_{22}-(\alpha+j\beta)] & \ldots & a_{2n} \\ \ldots & \ldots & \ldots & \ldots \\ a_{n1} & a_{n2} & \ldots & [a_{nn}-(\alpha+j\beta)] \end{vmatrix} = 0 \quad (1)$$

In order to solve Equation 1 we shall introduce $n$ auxiliary complete variables $(w_1+wz_1)$ to $(w_n+jz_n)$. These auxiliary variables do not appear in the final solution of the problem but are introduced to facilitate the obtaining of a solution of the problem.

Consider the system of $n$ equations:

Expanding, equating real and imaginary parts separately to zero and writing $w_1=1$, we find the following system of $2n$ linear simultaneously equations in $(2n-1)$ real unknowns:

$$(a_{11}-\alpha)+\beta z_1+a_{12}w_2+0+\ldots+a_{1n}w_n+0 = 0$$
$$-\beta+(a_{11}-\alpha)z_1+0+a_{12}z_2+\ldots+0+a_{1n}z_n = 0$$
$$a_{21}+0+(a_{22}-\alpha)w_2+\beta z_2+\ldots+a_{2n}w_n+0 = 0$$
$$0+a_{21}z_1-\beta w_2+(a_{22}-\alpha)z_2+\ldots+0+a_{2n}z_n = 0$$
$$\ldots\ldots\ldots\ldots\ldots\ldots\ldots\ldots\ldots\ldots\ldots\ldots\ldots\ldots$$
$$a_{n1}+0+a_{n2}w_2+0+\ldots+(a_{nn}-\alpha)w_n+\beta z_n = 0$$
$$0+a_{n1}z_1+0+a_{n2}z_2+\ldots-\beta w_n+(a_{nn}-\alpha)z_n = 0$$
$$(2)$$

If arbitrary numerical values for $\alpha$ and $\beta$ are chosen, the last $(2n-1)$ equations of this system may be solved for the $(2n-1)$ real unknowns $z_1, w_2, z_2, w_3 \ldots w_n z_n$ in the manner previously described. This being done, we shall then put the chosen $\alpha$, $\beta$ and the values of $z_1, w_2, z_2, w_3 \ldots w_n z_n$ so obtained into the first equation of system (2). If the values of $\alpha$ and $\beta$ which have been chosen are such that this first equation is satisfied, the systems of Equations 2 is consistent and the determinant:

$$\begin{vmatrix} (a_{11}-\alpha) & \beta & a_{12} & 0 & \ldots & a_{1n} & 0 \\ -\beta & (a_{11}-\alpha) & 0 & a_{12} & \ldots & 0 & a_{1n} \\ a_{21} & 0 & (a_{22}-\alpha) & \beta & \ldots & a_{2n} & 0 \\ 0 & a_{21} & -\beta & (a_{22}-\alpha) & \ldots & 0 & a_{2n} \\ \ldots & \ldots & \ldots & \ldots & \ldots & \ldots & \ldots \\ a_{n1} & 0 & a_{n2} & 0 & \ldots & (a_{nn}-\alpha) & \beta \\ 0 & a_{n1} & 0 & a_{n2} & \ldots & -\beta & (a_{nn}-\alpha) \end{vmatrix} \quad (3)$$

shall vanish. Now this determinant is identically equal to the sum of the squares of the real and imaginary parts of the determinant of (1), as can easily be shown by expansion. It follows therefore, that if determinant (3) vanishes, the real and imaginary parts of determinant (1) must separately vanish, which is the same thing as saying that Equation 1 is satisfied.

As pointed out previously, absolutely stable operation for the solution of a system of linear simultaneous equations requires twice the number of matrix amplifiers that would otherwise be needed. Thus, for a stable solution of the linear system derived from (2), $2(2n-1)=(4n-2)$ amplifiers are required. As we have seen, the equation solver of Fig. 1 contains 24 matrix amplifiers. Two of these, however, corresponding to the first equation of system (2), do not enter in the solution of the linear system derived from (2), since, in this case, the first equation is used only to determine whether chosen values of $\alpha$ and $\beta$ constitute a root. Thus we have: $(4n-2)=(24-2)$, or: $n=6$, which is the highest degree of secular equation that the device of Fig. 1 can handle.

However, as pointed out in connection with Fig. 1 some additional equipment is needed for the solution of secular equations. Referring to the system (2), we see that $(2n)$ potentiometers for "$\alpha$" and $(2n)$ potentiometers for "$\beta$" must be provided. Remembering that, for stable operation, the potentiometers of each group must be doubled, we have a set of $4n=4\times 6=24$ mechanically ganged potentiometers for "α" and another set of the same number—also mechanically ganged—for "β."

To find the complex roots of a secular equation, the secular equation is first expanded and real terms collected and written in the form of the equations of system (2). The matrix elements are then entered into the machine exactly as shown in the (2n) equations of system (2). (Note that for $n=6$ this requires a $12\times 12$ matrix, as provided in the machine described here). The "α" and "β" potentiometers are then rotated until the first equation of (2) is satisfied, as shown by the null indicator.

Thus to solve the above secular equation by means of the device of Fig. 1, after reducing the equations to the form shown in system (2), the procedure involves (1) setting the switches 23, 36 and 180 each to its "S" position, (2) setting the values of the "α" coefficients into the respective networks and (3) adjusting the ganged α and ganged β potentiometers for zero indication of the indicator connected to the lead 185. Under these conditions, the values indicated on the α and β knobs or dials are the real and complex roots, respectively, of the secular equation. There will be as many roots (distinct or not) as equations. The complex roots always occur in complex conjugate pairs.

*The "companion matrix" method of solving polynomials*

In accordance with this method, the device of Fig. 1 may be used to determine the real and complex roots of polynomials. The complex polynomial with real coefficients of degree $n$ may be written:

$$a_0 + a_1(\alpha+j\beta) + a_2(\alpha+j\beta)^2 + a_3(\alpha+j\beta)^3 + \ldots + a_n(\alpha+j\beta)^n$$

Dividing through by $a_n$ and writing $$p_k = \frac{a_k}{a_n}$$

with $k=0 \ldots n$, we get:

$$p_0 + p_1(\alpha+j\beta) + p_2(\alpha+j\beta)^2 + p_3(\alpha+j\beta)^3 + \ldots + (\alpha+j\beta)^n \quad (4)$$

Now it is easy to see that, if we have $\lambda=(\alpha+j\beta)$, the roots of the "companion matrix":

$$\begin{Vmatrix} -p_{n-1} & -p_{n-2} & \cdots & -p_1 & -p_0 \\ 1 & 0 & & 0 & 0 \\ 0 & 1 & & 0 & 0 \\ \vdots & & & & \\ 0 & 0 & \cdots & 1 & 0 \end{Vmatrix} \quad (5)$$

are the same as those of the polynomial (4). The problem is thus reduced to that of finding the real and complex roots of a secular equation of the type of (1).

In the case of the polynomial equation $$p_0 + p_1 r + p_2 r^2 + r^3 = 0$$

(where $r=\alpha+j\beta$ and $p_0$ to $p_{n-1}$ are all real), by introducing $n$, $(n=3)$, auxiliary complex variables $(x_1+jy_1)$ to $(x_3+jy_3)$, the following can be obtained $$(-p_2-\alpha-j\beta)(x_1+jy_1)-p_1(x_2+jy_2)-p_0(x_3+jy_3)=0$$
$$1(x_1+jy_1)+(-\alpha-j\beta)(x_2+jy_2)+0(x_3+jy_3)=0$$
$$0(x_1+jy_1)+(x_2+jy_2)+(-\alpha-j\beta)(x_3+jy_3)=0$$

for $n=3$ and (2) above becomes $$\begin{bmatrix} (-p_2-\alpha)x_1 & +\beta y_1 & -p_1 x_2 & +0y_2 & +p_0 x_3 & -0y_3 \\ -\beta x_1 & +(-p_2-\alpha)y_1 & 0x_2 & -p_1 y_2 & +0x_3 & -p_0 y_3 \\ 1x_1 & +0y_1 & -\alpha x_2 & +\beta y_2 & +0x_3 & +0y_3 \\ 0x_1 & +1y_1 & -\beta x_2 & -\alpha y_2 & +0x_3 & +0y_3 \\ 0x_1 & +0y_1 & +1x_2 & +0y_2 & -\alpha x_3 & +\beta y_3 \\ 0x_1 & +0y_1 & +0x_2 & +1y_2 & -\beta x_3 & -\alpha y_3 \end{bmatrix} = 0$$

The determinant of the above system becomes:

$$\begin{vmatrix} -p_2-\alpha & \beta & -p_1 & 0 & -p_0 & 0 \\ -\beta & -p_2-\alpha & 0 & -p_1 & 0 & -p_0 \\ 1 & 0 & -\alpha & \beta & 0 & 0 \\ 0 & 1 & -\beta & -\alpha & 0 & 0 \\ 0 & 0 & 1 & 0 & -\alpha & \beta \\ 0 & 0 & 0 & 1 & -\beta & -\alpha \end{vmatrix} = 0$$

Figure 6:
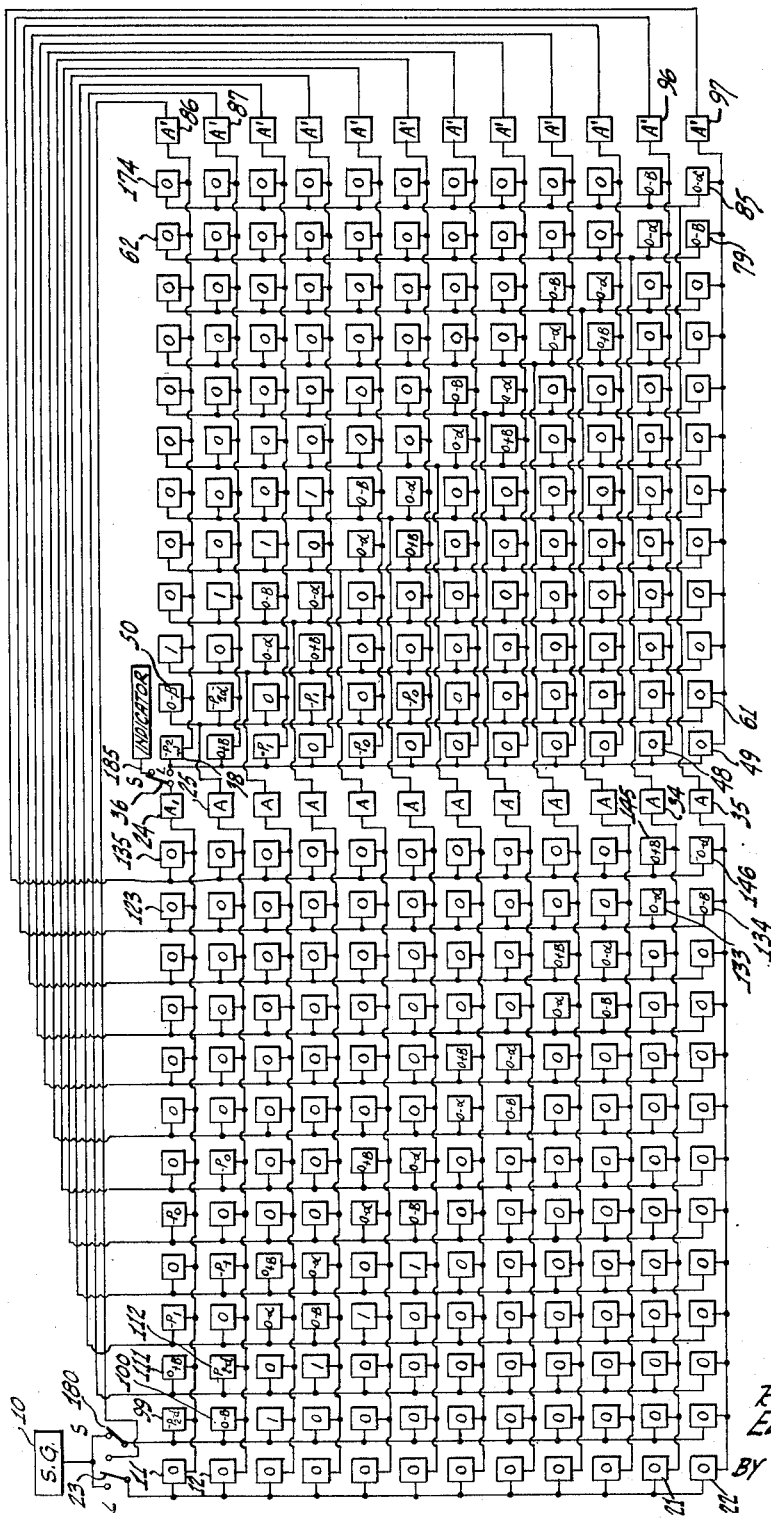
Fig. 6 is a block diagram of the device as set up for the solution of a polynomial.

This determinant is set into the equation solver as indicated by the legends applied to the networks of Fig. 6 which shows all the networks of the $12\times 12$ matrices.

The procedure of solution is the same as that set forth above in connection with secular equations.

It follows that the complex roots of polynomials of all degrees up to and including 6 can be found by means of the device herein described exactly as constituted for the solution of equations previously discussed. The procedure is in most respects identical to that which has been explained above for the solution of secular equations, the only difference being that, in the case of polynomials, a number of matrix elements remain equal to zero.

What the invention provides is an improved device which is readily operated to solve different types of equations.

What is claimed is:

1. An equation solver including original and transposed matrices each comprising a plurality of interconnected elements each of which elements includes a first and second voltage divider of the potentiometer type, means for adjusting the polarity and value of the output voltage of predetermined ones of said first voltage dividers according to the values of the known quantities of the equation to be solved, means for simultaneously adjusting the polarity and value of the output voltage of certain of the second of said voltage dividers according to the values of the real roots of said equation, and means for simultaneously adjusting the polarity and value of the output voltage of other of said second dividers according to the values of the imaginary roots of said equation.

2. An equation solver including original and transposed matrices each comprising a plurality of interconnected elements each of which elements includes a first and second voltage divider of the potentiometer type, means for adjusting the polarity and value of the output voltage of predetermined ones of said first voltage dividers according to the values of the known quantities of the equation to be solved, means for simultaneously adjusting the polarity and value of the output voltage of certain of the second of said voltage dividers according to the values of the real roots of said equation, means for simultaneously adjusting the polarity and value of the output voltage of other of said second dividers according to the values of the imaginary roots of said equation, and means connected to one of said matrices for indicating when the output voltages of said second voltage dividers are such that said equation is satisfied.

3. A device as set forth in claim 2 wherein the means for adjusting the output voltages of the second voltage dividers include means for indicating the values of the real and imaginary roots of the equation.

4. An equation solver including original and transposed matrices each comprising a plurality of interconnected elements each of which elements includes a first and second voltage divider of the potentiometer type, and means including switches settable to one position for interconnecting said matrices to solve linear simultaneous equations and to another position for interconnecting said matrices to solve secular equations and polynomials.

5. An equation solver including main and transposed matrices each comprising a plurality of interconnected elements each of which elements includes a first and second voltage divider of the potentiometer type, and means including switches settable to one position for interconnecting said matrices to solve one type of equation and to another position for interconnecting said matrices to solve other types of equations.

6. An equation solver including original and transposed matrices each comprising a plurality of interconnected elements each of which elements includes a first and second voltage divider of the potentiometer type, means for adjusting the polarity and value of the output voltage of predetermined ones of said first voltage dividers according to the values of the known quantities of the equation to be solved, and means for adjusting the output voltages of said second voltage dividers to polarities and values such that the output of said matrices is zero.

ROBERT SERRELL.
EDWIN A. GOLDBERG.

REFERENCES CITED

The following references are of record in the file of this patent:

"An Automatic Simultaneous Equation Computer and its Use in Solving Secular Equations," by W. A. Adcock; the Review of Scientific Instruments, volume 19, #3, March 1948.

"An Electronic Simultaneous Equat. Solver," Journal of Applied Physics, volume 19, #4, pages 339–345, April 1948.